US005484336A

United States Patent [19]
McConnell

[11] Patent Number: 5,484,336
[45] Date of Patent: Jan. 16, 1996

[54] TANK STRUCTURE FOR A HARVESTER

[75] Inventor: Kenneth C. McConnell, Ankeny, Iowa

[73] Assignee: Deere & Company, Moline, Ill.

[21] Appl. No.: 200,789

[22] Filed: Feb. 22, 1994

[51] Int. Cl.⁶ .................................................. A01D 75/00
[52] U.S. Cl. .............................. 460/119; 460/150; 56/28; 73/323
[58] Field of Search ................................... 460/119, 150; 56/28, 50; 73/302, 323

[56] References Cited

U.S. PATENT DOCUMENTS

| | | | |
|---|---|---|---|
| 3,490,460 | 1/1970 | Baumeister et al. | 460/119 |
| 4,150,525 | 4/1979 | DeBusscher et al. | 460/119 X |
| 4,343,184 | 8/1982 | Jaulmes | 73/323 X |
| 4,763,805 | 8/1988 | Strock | 220/85 A |
| 5,018,343 | 5/1991 | Finke | 56/12.1 |

Primary Examiner—Terry L. Melius

[57] ABSTRACT

A lubricant tank structure for a cotton harvester wherein the tank is located at the rear of a harvester behind the engine and near the fuel and water tanks. The tank shares support with an adjacent tank and is shaped to optimize use of available space. A bladder is installed inside the tank with an opening exiting below the fluid level of the lubricant. The opening is connected to a relatively small diameter sight tube located externally of the tank. The bladder is filled to the bottom level of the gauge with a indicating liquid having a lower viscosity than the grease which is to be gauged and a specific gravity which is approximately the same as the high viscosity grease. When the lubricant tank is filled, the tank contents displaces the indicating liquid which rises in the sight tube until the height of the liquid is approximately the same as the height of the grease so pressures in the system are equalized.

19 Claims, 3 Drawing Sheets

TANK STRUCTURE FOR A HARVESTER

BACKGROUND OF THE INVENTION

1) Field of the Invention

The present invention relates generally to crop harvesters and, more specifically, to grease tank structure for a cotton harvester or similar agricultural implement.

2) Related Art

Agricultural harvesters such as cotton pickers typically include a lubrication reservoir for supplying grease to bearing areas in the harvesting structure. In harvesters such as the John Deere model 9965 Cotton Picker, a spindle lubrication tank is positioned on a platform adjacent one side of the cab. Such a tank location raises and forwardly shifts the center of gravity of the machine, limits access to the area, often is aesthetically undesirable, and does not optimize use of available space on the harvester.

The lubrication tanks have been made of plastic material that is nearly transparent so grease level in the tank can be determined. For various reasons, including styling, an opaque tank often is desirable. However, providing a convenient grease level indication for such a tank has heretofore been difficult. Due to the viscosity of the spindle grease, the grease will not flow in a sight gauge. In addition, access to the tank lid for visual inspection of the inside of the tank is difficult because of the tank location.

BRIEF SUMMARY OF THE INVENTION

It is therefore an object of the present invention to provide an improved tank structure for a harvester which overcomes most or all of the abovementioned problems. It is a further object to provide such an improved tank structure which is advantageously located on the harvester for improved weight distribution, better use of available space, and increased tank capacity.

It is a further object of the present invention to provide an improved tank structure for a harvester wherein the level of a relatively high viscosity lubricant such as spindle grease can be determined without need for a transparent or translucent tank. It is yet another object to provide such a structure wherein tank level can be viewed from a convenient location.

It is still another object to provide an improved tank structure for a harvester which provides better harvester weight distribution and yet which is relatively simple and inexpensive in construction and optimizes use of available space. It is a further object to provide such a structure wherein lubricant level is easy to gauge, even if the lubricant has a relatively high viscosity.

In accordance with the above objects, lubricant tank structure is provided wherein the tank is located at the rear of a harvester near the fuel and water tanks. The tank shares support with an adjacent tank and is shaped to optimize use of available space. A flexible container is installed inside the tank with an opening exiting below the fluid level of the lubricant. The opening is connected to a relatively small diameter sight tube located externally of the tank. The flexible container is filled to the bottom level of the gauge with a indicating liquid having a lower viscosity than the grease which is to be gauged. The indicating liquid has a specific gravity which is approximately the same as the high viscosity grease. When the lubricant tank is filled, the tank contents displace the indicating liquid which rises in the sight tube until the height of the liquid is approximately the same as the height of the grease so pressures in the system are equalized. Therefore, the grease level can be easily and quickly determined by viewing the level of the indicating liquid in the tube. Tube location may be changed to accommodate different tank locations. The volume of the flexible container is substantially less than that of the tank so that there is a negligible decrease tank capacity caused by the gauging structure.

The lubricant tank structure is relatively simple and inexpensive. Transparent or translucent materials need not be used, and tanks can be styled in a variety of shapes and colors to be more pleasing to the eye. Tank shape as well as location are not limited by gauging considerations. Arranging the lubricant tank adjacent the other tanks at the rear of the harvester and rearwardly adjacent a transversely mounted engine permits larger tank capacity, and weight distribution can be better optimized to reduce front end loading on the harvester. The area of the platform near the harvester cab is cleared for better access.

These and other objects, features and advantages of the present invention will become apparent to one skilled in the art upon reading the following detailed description in view of the drawings.

DETAILED DESCRIPTION OF THE DRAWINGS

Figure 1:
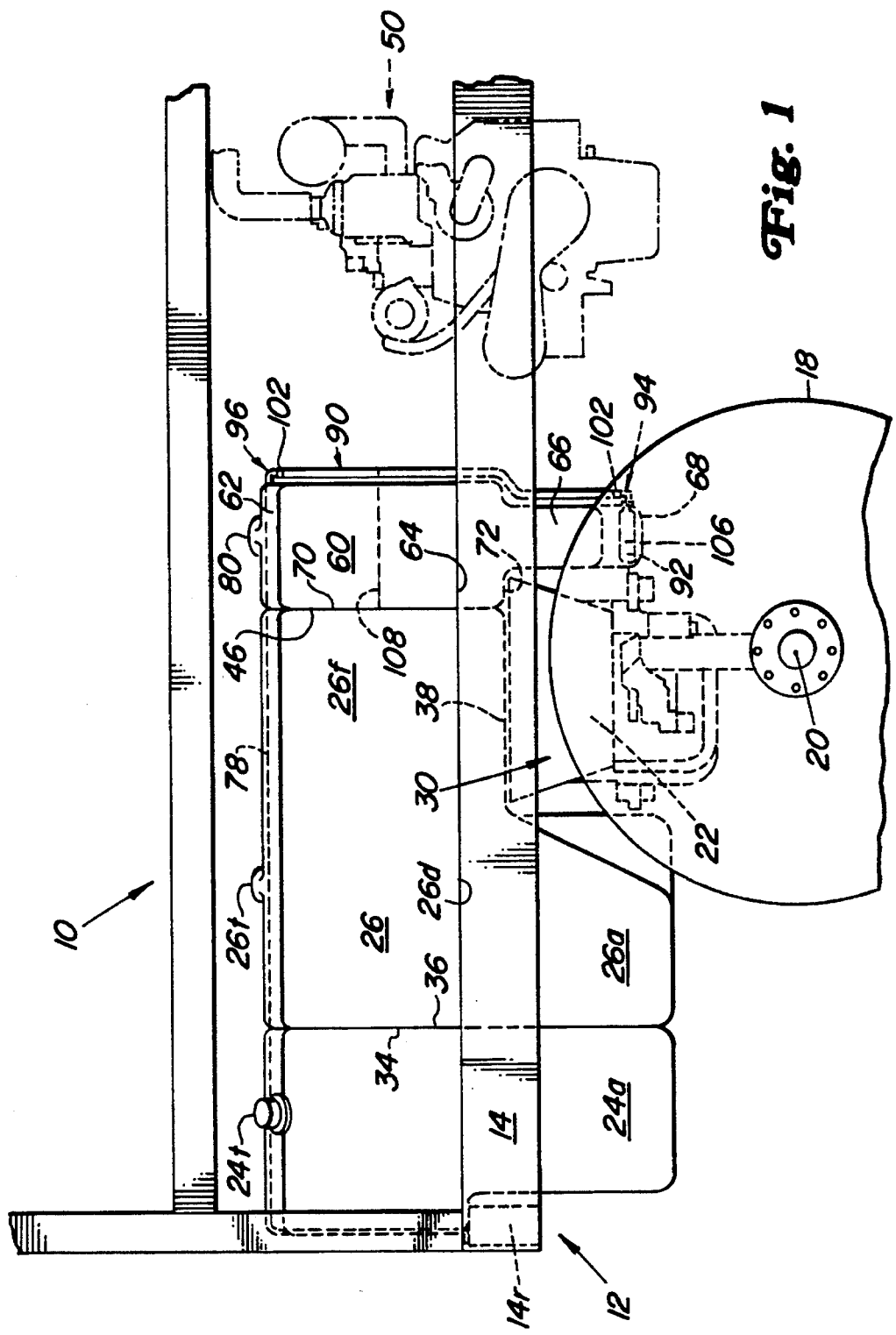
FIG. 1 is a side view of a portion of the rear of a cotton harvester frame supporting tank structure in accordance with the teachings of the present invention.

Referring now to FIG. 1, therein is shown a agricultural harvester 10 such as a cotton picker having a fore-and-aft extending main frame 12 with fore-and-aft extending and transversely spaced main beams 14. The frame 12 is supported for forward movement over the ground by forward drive wheels (not shown) and rear steerable wheels 18 mounted on axles 20. The axles 20 are carried on a pivoting axle support structure 22 connected between and extending below the beams 14. Conventional row harvesting units (not shown) are supported at the forward end of the main frame 12 rearwardly and below forward cab structure.

The harvester 10 includes a rear tank 24, preferably a fuel tank, supported on the aft end of the main beams 14 and having a lower portion 24a extending below the bottom of the beams 14. A second tank 26, preferably a spindle fluid tank, is also supported next to the tank 24 on the frame 12 and rests on structural members which carry the pivoting axle support structure 22. The tank 26 includes a rear lower portion 26a depending below the beams 14 adjacent the tank portion 24a rearwardly of the axles 20 to define an accommodation space 30 for the support for the steerable wheels 18. Tank lids 24t and 26t are provided near the top of the tanks 24 and 26. As can be seen in FIG. 1, the tanks 24 and 26 have generally planar mating forward and rearward walls 34 and 36, respectively. The tank 26 has a forward portion 26f with an elevated bottom 38 extending horizontally over and resting on the axle support structure 22. The forward end of the tank 26 terminates in a transversely extending planar wall 46. Downwardly directed ledges 24d and 26d near the transition area at the upper end of the portions 24a and 26a rest on the upper surface of the beams 14 and on a rear transverse connecting beam 14r which extends between the beams 14.

A transversely mounted engine 50 is supported from the frame 12 forwardly adjacent the rear steerable wheels 18. A crop receptacle (not shown) is mounted on the frame above the tanks 24 and 26 and the engine 50 for movement between field-working and dump positions.

Locating the tanks 24 and 26 and the transverse engine 50 rearwardly on the frame 12 help to lower the harvester center of gravity and move it rearwardly for better stability and handling. The transverse engine mounting frees up space along the frame 12 behind the engine 50. A grease tank 60 is mounted in the space forwardly adjacent the tank 26 and shares a portion of the support structure 22 with the tank 26.

Figure 2:
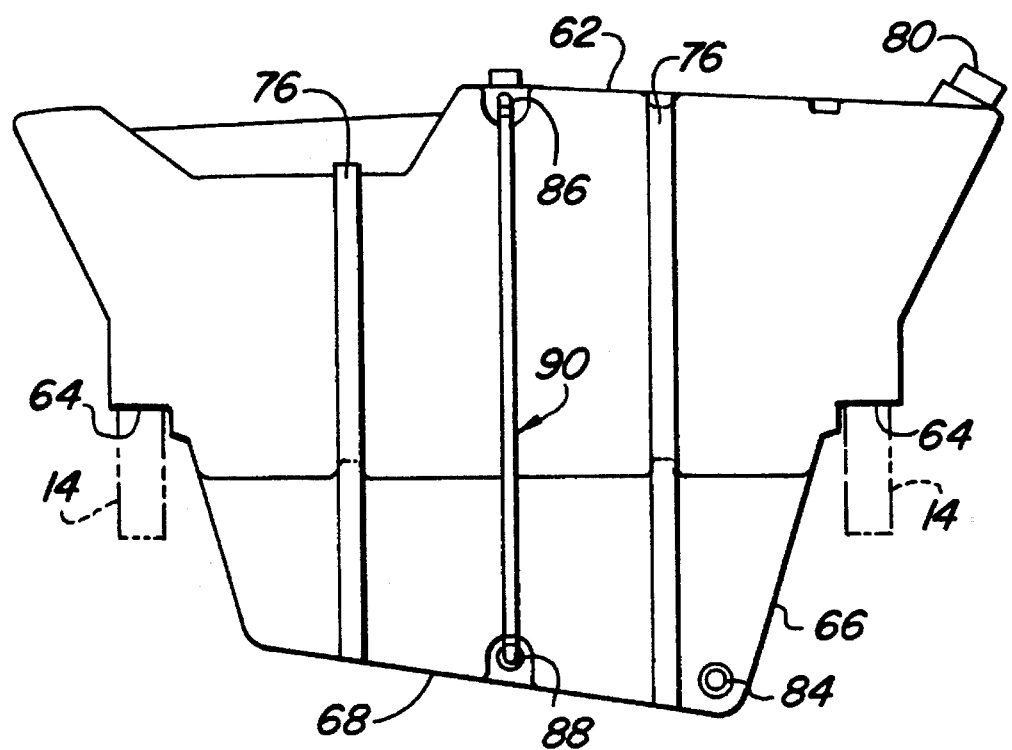
FIG. 2 is a front view of the tank structure shown in FIG. 1.

As seen in FIGS. 1 and 2, the tank 60 tapers inwardly from a relatively wide top 62 to side ledge portions 64 which rest on the tops of the beams 14. The tank 60 extends downwardly to a narrow lower portion 66 having an inclined bottom 68. A planar rear wall 70 abuts the forward wall 46 of the adjacent tank 26, and a ledge 72 at the location where the tank 60 narrows rests on the support structure 22. The setback of the lower rear wall of the lower portion 66 defines the forward area of the accommodation space 30 for the axle support structure 22.

Recesses 76 are formed in the tank 60, which preferably is molded from an opaque plastic, and hold down straps 78 positioned in the recesses extend from the support structure 22 and over the tank 60 and tanks 26 and 24 to a rear cross member 14r on the frame 12 to support the tank 60 and hold the tanks 24 and 26 against upward movement. The profiles of the tanks 24 and 26 are similar to that shown in FIG. 2 for the tank 60, and the three tanks 24,26 and 60 are easily assembled in position to form a compact, space-efficient fluid storage area having a low center of gravity and a rearward location on the frame for improved harvester weight distribution.

The tank 60 includes a cap 80 located in the top 62 at one side of the harvester. A tank outlet 84 near the lowermost portion of the inclined tank bottom 68 is connected via conduit (not shown) to a lubricant pump. An upper outlet or vent hole 86 and a lower outlet 88 are provided in the front wall of the tank 60 closely adjacent the top and bottom 62 and 68. Grease level indicating structure 90 is connected to the outlets 86 and 88 and includes a small bladder 92 resting on the tank bottom 68 and connected by a fitting 94 to the lower outlet 88. A fitting 96 is connected to the vent 86, and a sight tube 100 is secured by hose clamps 102 between the fittings 94 and 96. The bladder 92 is filled with a fluid or indicating liquid 106 such as oil having a specific gravity approximately equal to that of the grease 108 in the tank 60 but having a viscosity substantially less than that of the grease 106 so it can flow freely in the relatively small diameter sight tube 100. The tank contents 108 displace the indicating liquid 106 which rises in the sight tube 100 until the height of the liquid 106 is approximately the same as the height of the grease so pressures in the system are equalized. The sight tube 100 is easily shaped and positioned to match the tank shape and to provide a visual indication of grease level viewable from a location remote from the frame 12.

Figure 3:
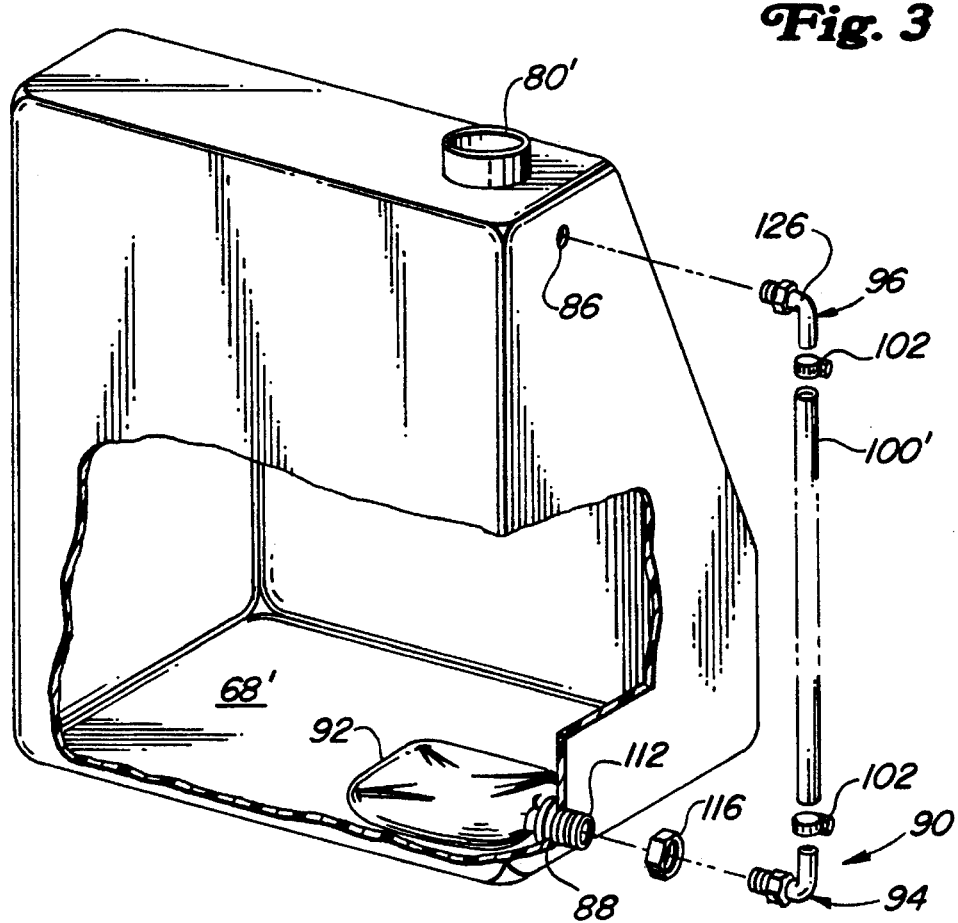
FIG. 3 is a perspective view of a tank with a flexible bladder and tube structure for providing a level indication.
Figure 4:
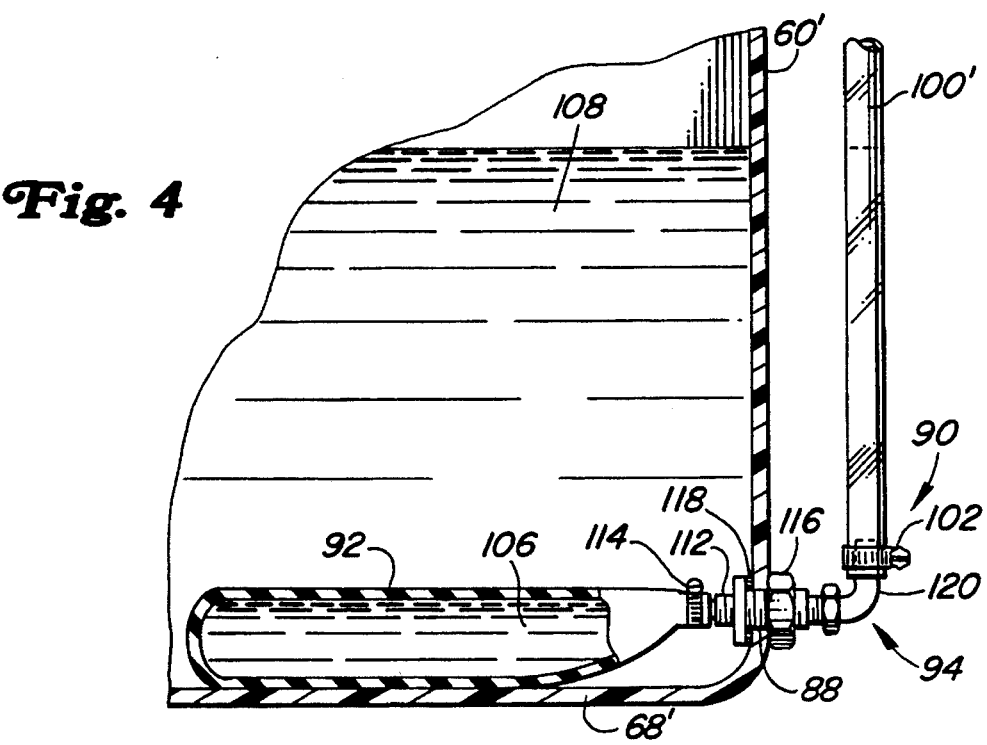
FIG. 4 is an enlarged sectional view of a lower portion of tank of FIG. 3 showing the connecting area between the tank, tube and bladder.

The structure and operation of the indicating structure is best seen in FIGS. 3 and 4 wherein a tank 60' is shown with the bladder 92 supported on the bottom 68' by the fitting 94.

The bladder 92 is secured to a threaded tubing section 112 by a clamp 114. The section 112 passes through the outlet 88 and is held in position by a nut 116 and is sealed by a washer 118. An elbow 120 is secured by a nut 122 to the section 112, and the tube 100' is connected to the elbow 120 by the clamp 102. The fixture 96 includes an elbow connected to the top of the tube 100' and secured within the vent hole 86.

The capacity of the tank 60 (60') is many times that of the bladder 92. For example, the grease tank 60 has a capacity of 65 gallons or more while the bladder capacity is about 250 milliliters. As the level of the grease 108 rises in the tank, the pressure acting on the bladder 92 increases to cause a column of indicating fluid 106 to rise in the tube 100 until the pressure of the column equals the pressure on the bladder 92. By using a fluid 106 of like specific gravity as the material 108 in the tank 100, the column height will be substantially the same as the height of the material 108. The indicating fluid 106 is isolated from the material 108.

Having described the preferred embodiment, it will become apparent that various modifications can be made without departing from the scope of the invention as defined in the accompanying claims.

I claim:

1. In an agricultural harvester having a fore-and-aft extending frame supporting an engine, tank structure for receiving and storing a fluid material such as grease having a preselected specific gravity and relatively high viscosity so that the fluid material does not flow freely through a small tube, the tank structure comprising:

an upright material container having a bottom and sidewall structure extending upwardly from the bottom;

a flexible bladder supported near the lower end of the container, the flexible bladder being at least partially filled with a liquid having a specific gravity approximately equal to the preselected specific gravity of the stored material and a viscosity less the viscosity of the material; and level indicating structure connected to the flexible bladder and including a tube extending upwardly above the level of the bottom for receiving the fluid therein and providing a level indication dependent on the level of material in the container.

2. The invention as set forth in claim 1 wherein the container is supported near the aft end of the frame rearwardly adjacent the engine, and wherein the level indicating structure is positioned adjacent the container to facilitate viewing of the tube from a location remote from the frame.

3. The invention as set forth in claim 1 including a tank supported at the aft end of the frame, and a transverse frame section connected to the main frame, wherein the transverse frame provides support for both the material container and the tank.

4. The invention as set forth in claim 3 wherein the tank and the material container have similar profiles and include ledge structure supported on the frame rearwardly adjacent the engine.

5. In a cotton harvester having a fore-and-aft extending main frame including transversely spaced beams supported for movement over the ground by wheel structure, the wheel structure including a rear wheel assembly located near the aft end of the main frame, an engine supported on the main frame adjacent the rear wheel assembly, a first tank located at the aft end of the frame behind the engine and supported between the beams on a support section of the main frame, the first tank adapted for containing a first fluid, and grease tank structure comprising a grease container for receiving grease, wherein the grease container is supported adjacent the engine and adjacent the first tank on the support section and includes structure in direct fluid communication with the container for determining grease level in the container from a location outside of the container.

6. The invention as set forth in claim 5 wherein the first tank and the container have substantially similar profiles, and the container abuts the first tank.

7. The invention as set forth in claim 6 wherein the support section includes a transversely extending frame portion, and wherein the first tank and grease container include bottom portions resting on the transversely extending frame portion.

8. The invention as set forth in claim 6 wherein the first tank and the container include downwardly directed ledge surfaces resting on the spaced beams.

9. The invention as set forth in claim 8 wherein the container includes a depending portion extending downwardly between the beams forwardly of the first tank and rearwardly of the engine.

10. The invention as set forth in claim 8 wherein the container is connected to the first tank.

11. The invention as set forth in claim 8 further including tie down structure extending around the tank and the container for maintaining the ledge surfaces on the beams.

12. The invention as set forth in claim 5 wherein the structure for determining grease level includes a bladder located in the container and containing an indicator fluid isolated from the grease by the bladder, and a tube connected to the bladder and extending outside the container for receiving the indicator fluid.

13. The invention as set forth in claim 12 wherein the indicator fluid has a viscosity substantially less than the viscosity the grease.

14. The invention as set forth in claim 13 wherein the tube includes an upright portion extending between the top and bottom of the grease container, and the indicator fluid has specific gravity approximately equal to the specific gravity of the grease so that the indicator fluid rises to a level in the tube approximately equal to the level of the grease in the grease container.

15. The invention as set forth in claim 12 wherein the tube has an uppermost end open to the atmosphere.

16. The invention as set forth in claim 5 wherein the engine comprises a transversely mounted engine located forwardly of the rear wheel structure, and the grease container is supported from the frame between one side of the engine and the first tank.

17. The invention as set forth in claim 16 wherein the container is molded from an opaque material.

18. The invention as set forth in claim 12 wherein the container includes a narrow bottom portion depending from the beams, wherein the bladder is located in the narrow bottom portion.

19. The invention as set forth in claim 18 wherein the bottom portion has a sloping bottom wall with a lowermost extremity, and further including an outlet located in the lowermost extremity.

* * * * *